United States Patent
Altamura

(10) Patent No.: US 10,444,607 B1
(45) Date of Patent: Oct. 15, 2019

(54) PROJECTOR LIGHTS

(71) Applicant: Seasonal Specialties, LLC, Eden Prairie, MN (US)

(72) Inventor: Steven J. Altamura, Scarsdale, NY (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 0 days.

(21) Appl. No.: 16/204,680

(22) Filed: Nov. 29, 2018

Related U.S. Application Data

(62) Division of application No. 15/729,137, filed on Oct. 10, 2017, now Pat. No. 10,156,777.

(60) Provisional application No. 62/410,364, filed on Oct. 19, 2016.

(51) Int. Cl.
| | | |
|---|---|---|
| *G03B 21/14* | (2006.01) | |
| *G03B 21/20* | (2006.01) | |
| *F21V 21/08* | (2006.01) | |
| *F21S 4/10* | (2016.01) | |
| *G03B 33/08* | (2006.01) | |

(52) U.S. Cl.
CPC .............. *G03B 21/145* (2013.01); *F21S 4/10* (2016.01); *F21V 21/0824* (2013.01); *G03B 21/142* (2013.01); *G03B 21/2053* (2013.01); *G03B 21/2093* (2013.01); *G03B 33/08* (2013.01)

(58) Field of Classification Search
CPC ...................................................... F21S 54/10
USPC ............................... 353/94; 352/98.133, 135
See application file for complete search history.

(56) References Cited

U.S. PATENT DOCUMENTS

| | | | |
|---|---|---|---|
| 6,478,453 B2 * | 11/2002 | Lammers | F21S 6/002 353/23 |
| 6,902,292 B2 | 6/2005 | Lai | |
| 7,357,520 B2 | 4/2008 | Vitsntonio | |
| 8,545,028 B2 * | 10/2013 | Fischer | G03B 21/50 352/87 |
| 8,567,961 B2 * | 10/2013 | Huebner | G03B 21/2013 352/87 |
| 9,310,059 B2 | 4/2016 | Zhang | |
| 9,395,608 B2 | 7/2016 | Zhang | |
| 9,869,459 B2 * | 1/2018 | Lentine | F21V 29/70 |
| 2016/0025309 A1 | 1/2016 | Zhang | |

OTHER PUBLICATIONS https://www.athome.com/santa-led-projctr-spotlight/124212705.html#sz=225&start=1; Santa LED Projctr Spotlight—At Home, pp. 1-2, Oct. 10, 2017.

* cited by examiner

*Primary Examiner* — William C. Dowling
(74) *Attorney, Agent, or Firm* — Hamre, Schumann, Mueller & Larson, P.C.

(57) ABSTRACT

A projection light source system and method of manufacture are shown in various embodiments. In one embodiment a single projector head (12) includes a light source (95) which projects through a condenser lens (90) and then an image transparency 120 which may be film or other digital media, and through an imaging lens 140 which is adjustable by rotation of a threaded cap 150. Adjustment of the image target location is achieved in part via an adjustment in the flange (20) which is rotatably connected to the head. Sequencing of images from a plurality of heads which are internally, remotely or IP controllable creates the ability project a succession of fixed images from a succession of heads either overlapping their target point or adjacent to create the effect of motion.

13 Claims, 5 Drawing Sheets

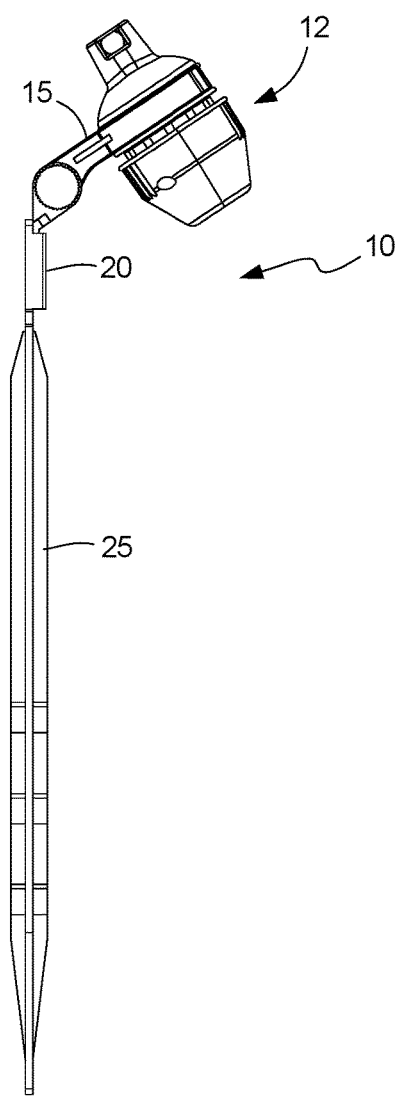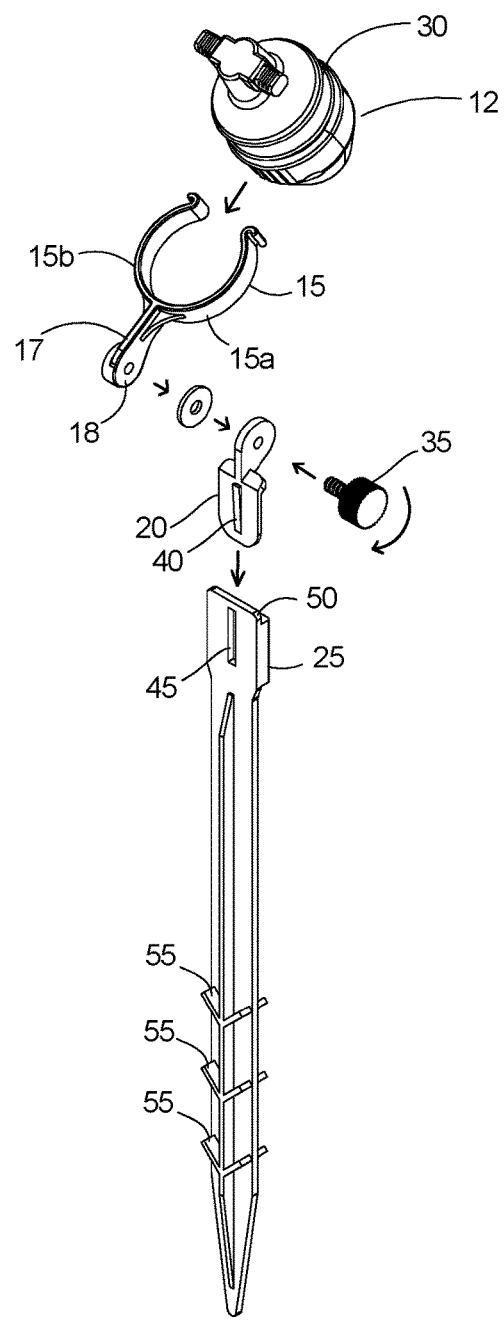
FIG. 1
FIG. 2

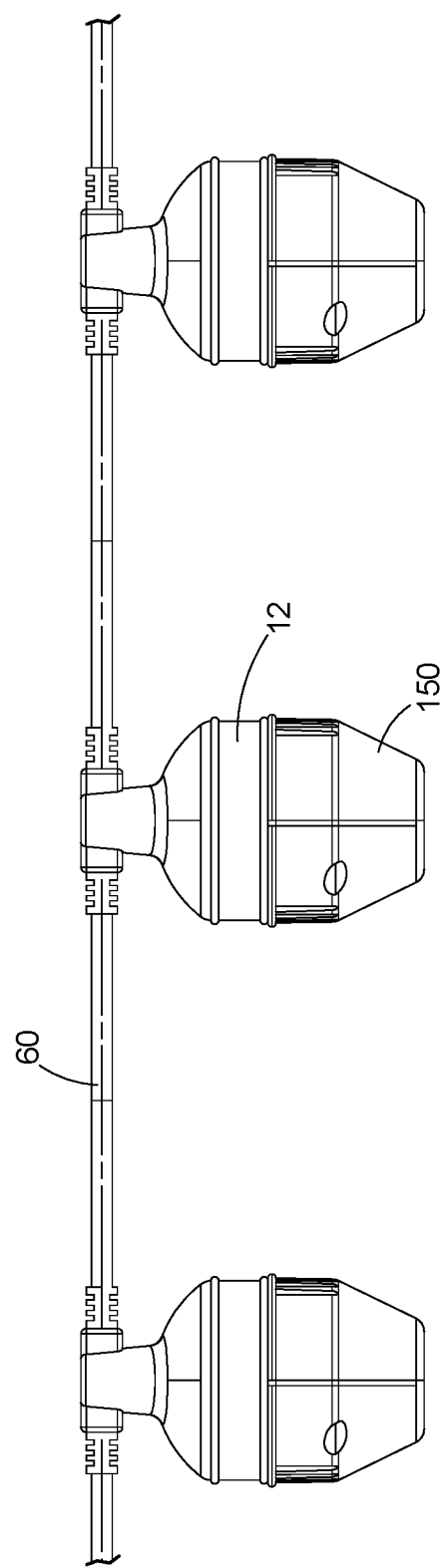

PROJECTOR LIGHTS

FIELD OF THE DISCLOSURE

The present invention is directed to ornamental lighting, more specifically lighting used to project an image.

BACKGROUND

Ornamental lighting, particularly outdoor lighting is generally difficult to install and use a considerable amount of energy. Often the climatic conditions are not favorable and there is danger in installing strings of lights on tall structures which require a ladder. A solution is needed which eliminates the drawbacks of prior art string lights which are easy to install but provide engaging imagery while providing energy savings.

BRIEF SUMMARY

To assist the reader in preparing to digest the detailed description and claims below, a short summary has been provided. It is far from complete and only provides a glimpse of the invention concepts. It is not intended to define the scope of the invention. The claims perform that function.

The present disclosure shows projector light or light system, in the case of a string of projectors, which via stakes can be mounted on the ground, without stakes, on rooflines, typically outdoors, though interior use is also contemplated. The projector light has a head containing a lighting element, a lens system, a focus system, a bi-directional mounting system, using a U-clip, which may include a stake mount for outside use. The projector head may also include an image slide which is projectable onto a surface, such as a house, window, tree, pathway, driveway, patio, deck, or an interior wall, for example. If an array (string) of lights is included, the projection can be sequenced in a user selectable or programmed pattern to project different images on the desired surface, or with flashing, fading color changing and other effects. The result is a large surface area which can be illuminated with or without an image and in any desired light pattern. For outdoor use, the projector can include a collar which is articulatable and can be removably mounted on a ground stake. Thus, minimal installation is required. The disclosure further includes: a projector lamp system having any or all of the following elements: a plurality of individual projection heads or just a single projection head, each having a remotely controllable light source, each head having an adjuster to aim the head location and a focuser to focus the light source on a target, and a fixed image transparency or an electronic display, such as an LCD, through which the light source output must pass, thereby projecting an image on the target; where the target could be a wall, driveway, deck surface, etc., the transparency may also be replaced by a digital display screen such as an LCD, through which light may be projected through the screen. This will allow for changing images or moving images; a programmable controller for actuating said light source in a sequence or randomly amongst said plurality of heads to project a plurality of overlapping images to create the impression of a moving image.

The disclosure further includes each of said heads being positioned to point to substantially the same target and wherein the heads are sequentially activated to project different images, resulting in a visual effect of a moving image.

The disclosure further includes each of said heads being positioned to point to sequentially adjacent targets and wherein the heads are sequentially activated to project different images, resulting the a visual effect of a moving image across the adjacent targets.

The disclosure further includes a projector lamp for projecting an image on a target, having any or all of the following elements:
a projection head, having:
a housing;
a controllable light source within the housing; the light source may be remotely controlled or actuation may be trigged by other signals such as using the 50/60 hz line power line as a clock (or internal clock) to generate timing pulses;
optionally, a light condenser having a recess on one face, said received sized to receive at least part of the light source therein and surrounding at least part of the light source, the other face of the condenser including a domed projection surrounded by a circular recessed region;
a film or digital transparency optically aligned with said light source:
an adjustable focusing head also optically aligned with said light source and said transparency, said focusing head being positionable in line with the focal axis to adjust the focus of said light source on the target.

The disclosure further includes a programmable controller for actuating said light source with respect to any or all of the following parameters: color, intensity, fading, latency or frequency of illumination.

The disclosure further includes a circular recessed region on the condenser includes a peripheral edge, a concave sloped circular region and a spherical domed region centrally within and extending outwardly from the concave region, to disburse the light source output evenly through the film.

The disclosure further includes a projector lamp for projecting an image on a target, including any or all of the following elements:
a projection head, having circular housing;
a yoke having two circular arms joined at one end and open at the other end, the arms being resilient;
a planar extension from said yoke extending from where the arms are joined toward a distal end thereof, the extension including;
a sloping land projecting from said extension, the slope rising from the distal end of the extension;
a ground stake having an extension receiver, said receiver including an opening sized to receive a portion of said planar extension therein, said receiver including a face with a slot sized to receive said sloping land therethrough, said receiver being sufficiently deflectable to allow said sloping land to fit into said receiver and pass through said opening when said extension is received within said receiver, thereby locking the land in said slot;
said stake and said head being rotationally connected to each other through a rotational connection between said yoke and planar extension.

The disclosure further includes a yoke with a flange with an aperture and wherein said planar extension includes a flange with an aperture and wherein said flanges are rotationally joined through said aperture and fixable in position by a fastener through said apertures.

The disclosure further includes a method of simulating moving projected images from a plurality of separate movable light projectors comprising any or all of the following steps in any order:

a. locating a plurality fixed image projectors facing a target surface, said projector including a single projectable images, each of the projectors having a different image;

b. optionally, aligning the focal points of each image projector to be at substantially the same location on the target surface and an indicator for alignment;

c. sequentially or randomly illuminating the images at the target surface, so that a viewer's impression is that the image is moving. It is possible to include an alignment beam transmitted from each projector. The beam will then project a point on the target surface. By aligning each of the beams to a single spot, the projector images will be fully converged.

The disclosure further includes a method wherein said images in said projectors are a sequential advance of the prior image and illuminating said projectors in the same sequences as the images.

The disclosure further includes a method of simulating moving projected images from a plurality of separate movable light projectors comprising any or all of the following steps in any order:

a. locating a plurality fixed image projectors facing a target surface, said projector including a single projectable image, each of the projectors having a different image;

b. aligning the focal points of each image projector to be at substantially sequentially adjacent positions on the target surface;

c. sequentially illuminating the images the target surface, so that a viewer's impression is that the image is moving across the target.

d. optionally changing the illumination to fade, flicker, flash, color change, or other similar lighting effect.

BRIEF DESCRIPTION OF THE SEVERAL VIEWS OF THE DRAWINGS

FIG. 1 is a side plan view of a projector light assembly with projector head, yoke and stake.

FIG. 2 is perspective exploded view of FIG. 1.

FIG. 5 is a close up top view of a string of projector lights with the yoke and stake removed.

DETAILED DESCRIPTION

Figure 4:
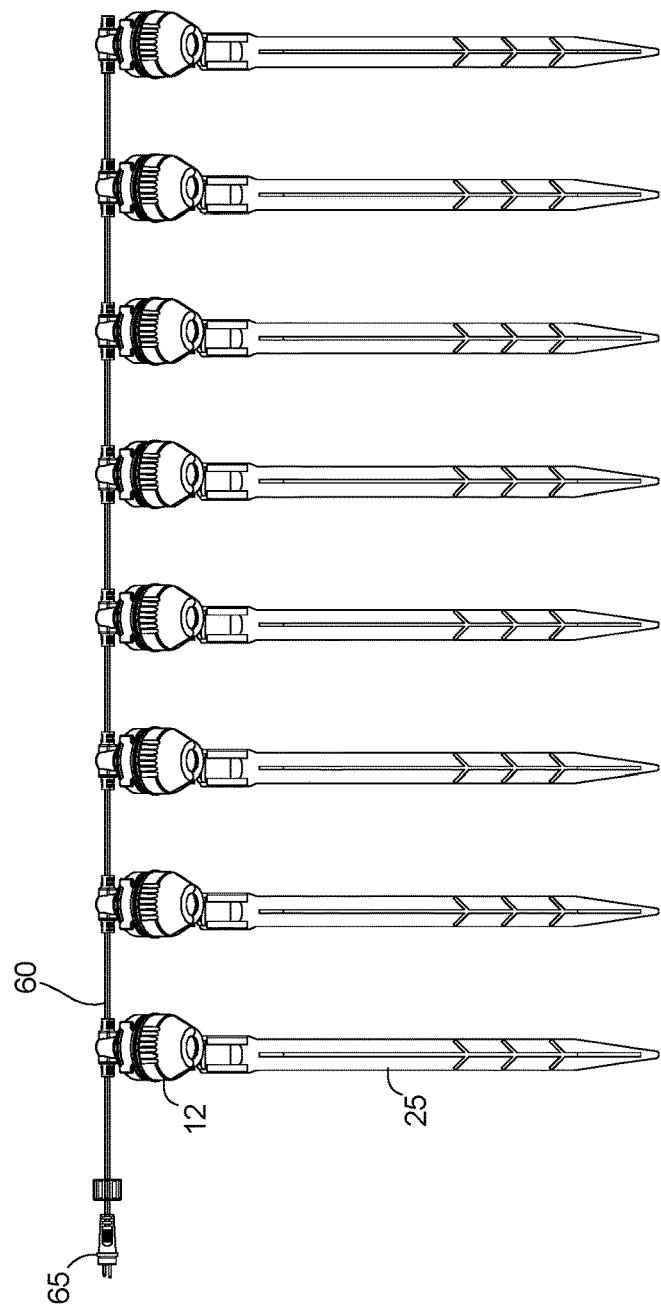
FIG. 4 is a front plan view a string of projector lights of FIG. 1.

This disclosure describes a single light projector, and a system of projector lamps, a control system and a method of making or operating same, in various related embodiments.

FIGS. 1 and 2 illustrates an assembled light projector 10, with a projector head 12, a yoke 15, an articulating flange 20, which is optionally inserted into a ground stake 25, when used outdoors to mount the projector to the ground.

Yoke 15 includes a pair of resiliently biased arms 15a/15b which resiliently expands to receive a recess 30 on head 12 to make the head removable against the bias force. An extension 17 extends from the arms 15a/b and includes a planar portion 18 with an aperture for receiving a set screw/bolt 35. A like aperture on flange 20 allows bolt 35 to pass through both members and be tightened against a nut to releasably lock the flange and yoke together at a user selectable angle which set the projection angle for the head 12.

Flange element 20 includes a progressively sloped land 40 (higher as it approached the aperture) which is received in a like slot 45 in the upper pocket 50 of the stake 25. Pocket 50 has an aperture sized to receive a portion of the flange element and deflect in the region of slot 45. When the flange is inserted, a wall of the pocket gives way and allows the oversized land to pass into the slot providing for a one way fit, or alternatively designed with the flange having tapers on both ends, to be removable. The flange can be removed under sufficient force or with the use of a tool to deflect the pocket wall when designed with an oversized tapered land.

The stake has strength reinforcing walls 55 which make it more rigid for insertion into the ground, along with V-shaped anchors 55/56 to help secure it into the ground to prevent unintended removal from the ground.

Figure 3:
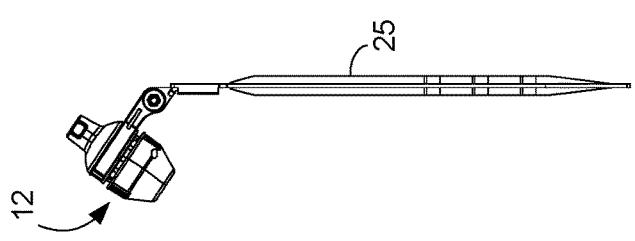
FIG. 3 is a view like FIG. 1 except the other side, which is symmetric.

FIG. 3 illustrates a projector head downwardly pointed on a stake, such as when illuminating a pathway. FIG. 4 illustrates an interconnected string of projectors. The wiring 60 is can be connected in parallel or series circuits and the illumination element (not shown in this figure) is preferably IP addressable so that it may be controlled remotely and individually. Element 65 is a power connector/power supply/transformer/power cord/controller.

FIG. 5 is a close up view of the wiring arrangement.

Figure 6:
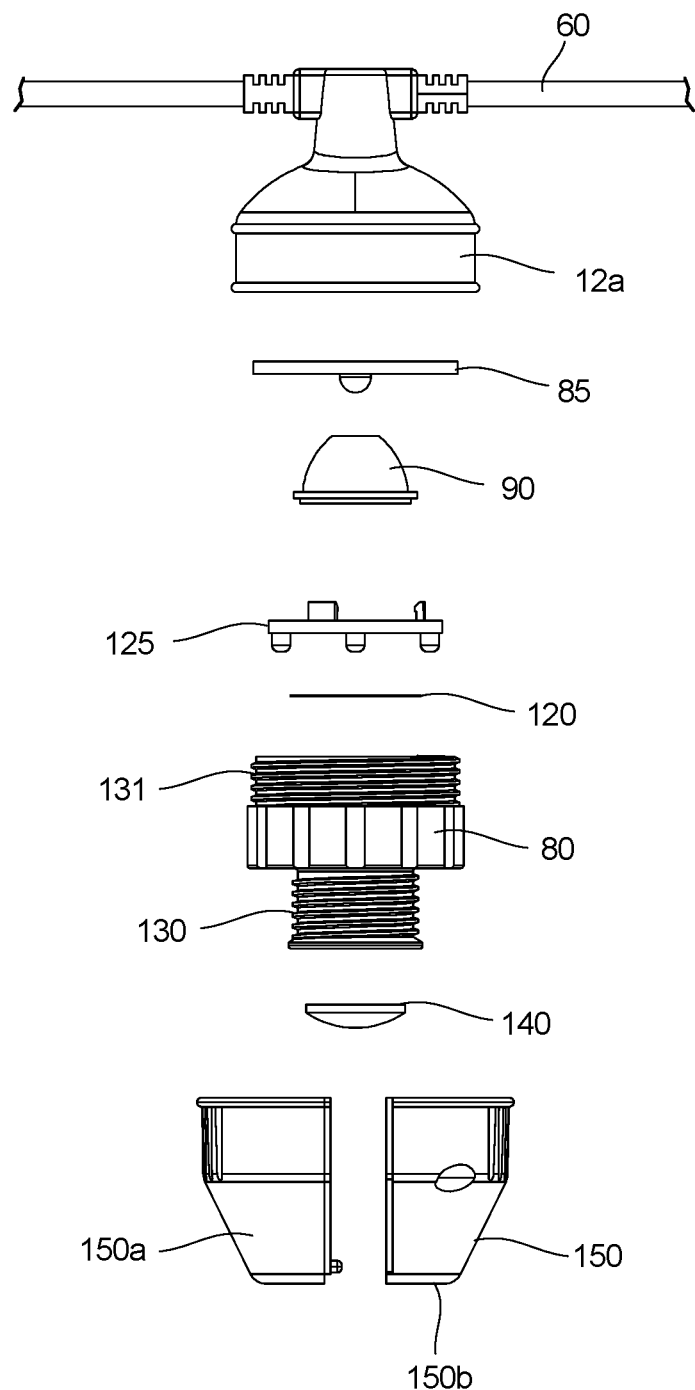
FIG. 6 is an exploded side view of a light head from FIG. 5.
Figure 7:
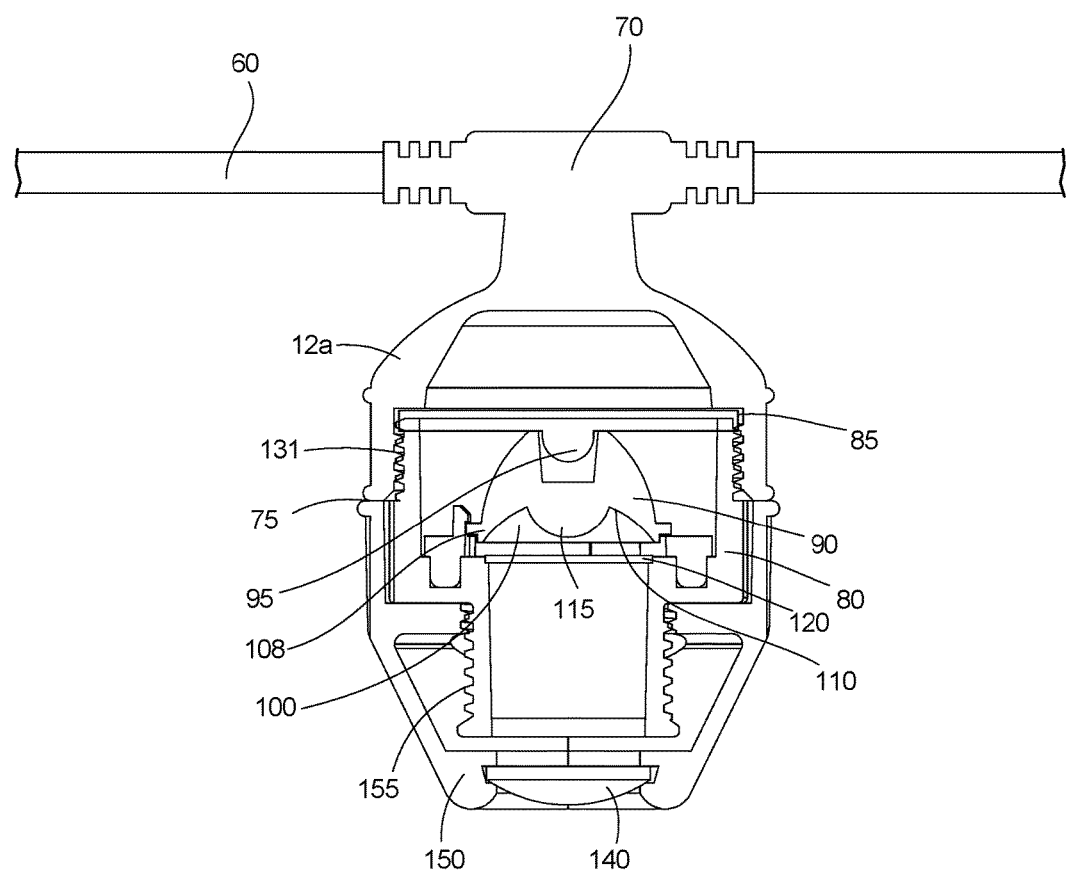
FIG. 7 is an interior sectional view of a light head.

FIGS. 6 and 7 illustrate the projector head in detail.

Head 12 has an outer shell element 12a which is preferably formed integrally with an electrical hood and stress reliever 70 in a T-shape with an incoming and outgoing electrical lead.

The shell element 12 has an inner thread attachment which mates with a core unit 80 which has a thread sized to fit into thread 75. Other attachment means are possible. Starting at the base 12, a circuit board with a central LED sits within shell 12a, though it could also be in the central or lower part.

Atop the LED or other illumination element is a condensing lens 90 which has a cylindrical recess 95 sized to receive a portion of the LED into the domed portion of the condenser. In this embodiment, the recess is cylindrical with a flat distal end wall, but the wall could also be convex or concave to create other effects. The opposite end of the condenser has a cylindrical recess 100 which slopes down from the outer peripheral wall 105 to a bottom region 110 and then upwardly to a domed apex 115. This shape more evenly distributes the light generated by the LED.

On the inside of the core unit 80 is a filter or transparency 120 which fills an optical passage in the core unit. The transparency typically contains an image (f. ex. as snowflake) which will be projected, and can be replaced with a digital image, such as an LCD screen or other similar design.

The transparency is an image imprinted on a light transmissible film, glass, or digital media.

Retainer 125 holds the transparency against a shelf in the core unit so that it is sandwiched therebetween.

Core 80 has a second threaded collar 130 concentric with the larger diameter threaded portion 131. An optical passageway for the LED extends through both threaded portions.

Optionally, at the distal end of collar 130 has may contain a flange for support of focal imaging lens 140. Alternatively, the lens may by affixed to the head by adhesive, crimping or other means or be supported entirely by the halves 150a/b which may have a circumferential recess for retaining the lens. A focusing cap 150 has a threaded section 155 in its interior which is sized to receive threaded portion 130 of the core 80. Cap 150 also carries the imaging lens 140 so that rotation of the cap changes the local location of lens 140 allowing the user to adjust the focus of the projected image. Cap 150 is formed of two symmetrical halves 150a/150b along a split line and held together by fasteners.

The LED(s) in the projector heads 12 may be IP addressable or otherwise remotely or internally controllable with respect to color, timing, sequencing, etc. for example, the series of heads in FIG. 4 may project a sequence of related or unrelated images according to user programming. The images could be sequences which show movement across the projected surface, for example, of twinkling of images, such as snowflakes, or flashing in a sequence to show a crawling spider, for example. The heads may be aligned to overlap their projection location so that moving images are possible in a fixed location, or aimed into adjacent locations to that movement across a surface is possible.

The head(s) may also be controllable with respect to the following parameters: color, intensity, flashing, fading, latency (how long the image appears projected) or frequency of illumination (how long the image is illuminated and periods where the source is off). The projection system may be powered by an AC source or DC source, or other power source.

The above description and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A projector lamp for projecting an image on a target, comprising:
   a plurality of projection heads, each of the heads been individual units which are separately locatable and positionable and having:
   a housing;
   a light source;
   a light condenser having a recess on one faces, said recess sized to receive at least part of the light source therein and surrounding at least part of the light source, the other face of the condenser including a domed projection surrounded by a circular recessed region;
   a film transparency optically aligned with said light source:
   an adjustable focusing head also optically aligned with said light source and said transparency, said focusing head is positionable along the focal axis to adjust the focus of said light source on the target.

2. The projection heads of claim 1 with a controllable light source within the housing.

3. The projection heads of claim 1 further including a programmable controller for actuating said light source with respect to any or all of the following parameters: color, intensity, flashing, fading, latency or frequency of illumination.

4. The projector heads of claim 1 wherein the circular recessed region on the condenser includes a peripheral edge, a concave sloped circular region and a spherical domed region centrally within and extending outwardly from the concave region, to disburse the light source output evenly through the film.

5. A projector lamp for projecting an image on a target, comprising:
   at least one projection head, having:
   a housing;
   a light source;
   a light condenser having a recess on one faces, said recess sized to receive at least part of the light source therein and surrounding at least part of the light source, the other face of the condenser including a domed projection surrounded by a circular recessed region;
   a film transparency optically aligned with said light source:
   an adjustable focusing head also optically aligned with said light source and said transparency, said focusing head is positionable along the focal axis to adjust the focus of said light source on the target and wherein the at least one projection head contain controllers and timing is maintained by the frequency of AC line power, a carrier signal on a DC source, or a carrier signal on an AC source.

6. The system of claim 1 wherein at least one projection head is positioned to point to substantially the same target and wherein the heads are sequentially activated to project different images, resulting the a visual effect of a moving image.

7. The system of claim 1 wherein at least one projection head is positioned to point to sequentially adjacent targets and wherein the heads are sequentially activated to project different images, resulting the a visual effect of a moving image across the adjacent targets.

8. A method of simulating moving projected images from a plurality of separately movable light projectors comprising the steps of:
   a. locating a plurality individual and separately locatable image projectors facing a target surface, said projector including at least one projectable image, each of the projectors having a different image;
   b. aligning the focal points of each image projector to be at substantially the same location on the target surface;
   c. sequentially illuminating the images the target surface, so that a viewer's impression is that the image is moving.

9. The method of claim 8 wherein said images in said projectors are a sequential advance of the prior image and illuminating said projectors in the same sequences as the images.

10. The method of claim 8 further including the step of projecting an alignment beam from each of said light projectors on a single point on a target surface spaced from said projectors; aligning said beams on said single point.

11. The method of claim 8 further including the step of projecting an alignment beam from each of said light projectors on a single point on a target surface spaced from said projectors; aligning said beams on said single point, and then projecting said images sequentially after image alignment.

12. The method of claim 8 wherein said sequential illumination is a random order.

13. A projector lamp system for projecting an image on a target, comprising:
   a plurality of projection heads each having:
   a housing;
   a light source;
   an alignment beam;

a light condenser having a recess on one faces, said recess sized to receive at least part of the light source therein and surrounding at least part of the light source, the other face of the condenser including a domed projection surrounded by a circular recessed region;

a film transparency optically aligned with said light source:

an adjustable focusing head also optically aligned with said light source and said transparency, said focusing head is positionable along the focal axis to adjust the focus of said light source on the target;

whereby said alignment beam is projected from each head so that the heads may be positioned for convergence of their alignment beams on the target, so that when the images are projected from each head, they are aligned is aligned;

a sequential activator to sequentially activate the light source on each head so that the heads are sequentially activated to project different images, resulting the a visual effect of a moving image.

* * * * *